(12) United States Patent
Kelly et al.

(10) Patent No.: US 7,662,292 B2
(45) Date of Patent: Feb. 16, 2010

(54) RADIUM SELECTIVE MEDIA AND METHOD FOR MANUFACTURING

(75) Inventors: Michael D. Kelly, Collierville, TN (US); Peter F. Doorley, Bartlett, TN (US)

(73) Assignee: Envirogen Technologies, Inc., Kingwood, TX (US)

( * ) Notice: Subject to any disclaimer, the term of this patent is extended or adjusted under 35 U.S.C. 154(b) by 0 days.

(21) Appl. No.: 12/317,128

(22) Filed: Dec. 19, 2008

(65) Prior Publication Data

US 2009/0159532 A1    Jun. 25, 2009

Related U.S. Application Data

(60) Provisional application No. 61/008,974, filed on Dec. 21, 2007.

(51) Int. Cl.
  *C02F 1/42* (2006.01)
(52) U.S. Cl. .............. 210/688; 502/402; 502/405; 502/406
(58) Field of Classification Search ............. 210/688; 502/402, 405, 406
See application file for complete search history.

(56) References Cited

U.S. PATENT DOCUMENTS

| | | | |
|---|---|---|---|
| 2,642,514 A | 6/1953 | Herkenhoff | |
| 3,094,846 A | 6/1963 | Peeler, Jr. | |
| 3,136,715 A | 6/1964 | Ames, Jr. et al. | |
| 3,449,065 A | 6/1969 | Kremer | |
| 3,703,208 A | 11/1972 | Heckman et al. | |
| 3,896,045 A | 7/1975 | Peeters et al. | |
| 4,054,320 A | 10/1977 | Learmont | |
| 4,636,367 A | 1/1987 | Huck et al. | |
| 4,664,809 A | 5/1987 | Fenton et al. | |
| 4,720,422 A | 1/1988 | Higuchi et al. |
| 4,804,498 A | 2/1989 | Mizuno et al. |
| 5,196,124 A | 3/1993 | Connor et al. |
| 5,324,433 A | 6/1994 | Grant et al. |
| 5,591,346 A | 1/1997 | Etzel et al. |
| 5,728,302 A | 3/1998 | Connor et al. |

(Continued)

FOREIGN PATENT DOCUMENTS

AU    20610/92    2/1993

(Continued)

OTHER PUBLICATIONS

Michel, J., et al., γ-Ray Spectrometry for Determination of Radium-228 and Radium-226 in Natural Waters, Anal. Chem. 53, 1885-9, Oct. 1981.

(Continued)

*Primary Examiner*—Chester T Barry
(74) *Attorney, Agent, or Firm*—Ray F. Cox, Jr.

(57) ABSTRACT

Media for selectively removing radium ions from water where manganese oxide (DMO) has been dispersed in a cation ion exchange resin (gel or macroporous) to adsorb radium ions. The media is manufactured by precipitating a soluble manganese (II) salt such as manganous sulfate with a permanganate salt such as sodium permanganate inside a strong acid cation (SAC) to form a resin containing highly dispersed manganese oxides. The resin is then post treated with a reducing agent such as sodium metabisulfite ($Na_2S_2O_2$) to prevent the leaching of soluble manganese from the resin. The reducing treatment ensures that soluble manganese species will be converted into an insoluble oxide form.

40 Claims, 2 Drawing Sheets

U.S. PATENT DOCUMENTS 7,291,578 B2 *   11/2007   SenGupta et al. ............ 502/402

FOREIGN PATENT DOCUMENTS

| AU | 24656/92 | 3/1993 |
| AU | 27389/92 | 4/1993 |
| AU | 26931/92 | 5/1993 |
| EP | 0071810 A1 | 2/1983 |
| EP | 0071810 B1 | 2/1983 |

OTHER PUBLICATIONS

Snoeyink, V., et al., Strong-Acid Ion Exchange for Removing Barium, Radium, and Hardness, Journal AWWA, 66-72, Aug. 1987.
Myers, A., et al., Removing Barium and Radium Through Calcium Cation Exchange, Journal AWWA, 60-66, May 1985.
Hahn, Jr., N., Disposal of Radium Removed from Drinking Water, Journal AWWA, 71-78, Jul. 1988.
Clifford, D., Radium Removal from Water Using Softeners and Point-of-Use Devices, Water Quality Association Annual Convention, pp. 37-62, Mar. 1989.
Subramonian, S., et al., Evaluating Ion Exchange for Removing Radium from Groundwater, Journal AWWA, 61-70, May 1990.
Clifford, D., Removal of Radium from Drinking Waters, in Radon in Drinking Water, Chap. 16, pp. 225-247, ed. Cothern and Rebers, date unknown.
Clifford, D., Radon, Radium and Uranium in Drinking Water, Chap. 16, pp. 234-238, ed. by Cothern and Rebers, 1990.
Clifford, D., et al., Evaluating Various Absorbents and Membranes for Removing Radium from Grounwater, Journal AWWA, 94-104, Jul. 1988.
King, P., Discussion of "Radon Distribution in Domestic Water of Texas," Ground Water Journal, 27, 403-407, May-Jun. 1989.
Snoeyink, V., et al., Barium and Radium in Water Treatment Plant Wastes, EPA R&D Project Summary, EPA/600/S2-85/006, Mar. 1985.
King, P., et al., Ground Water Geochemistry of 228Ra, 226Ra and 222Rn, Geochimica et Cosmochimica Acta 46, 1173-1182, 1982.
Longtin, J., Occurrence of Radon, Radium, and Uranium in Groundwater, Journal AWWA, 84-93, Jul. 1988.
Rama et al., Mechanism of transport of U-Th series radioisotopes from solids into ground water, Geochimica et Cosmochimica Acta 48, 395-399, 1984.
Cech, I. et al., Radon Distribution in Domestic Water of Texas, Ground Water, 26, 561-569, Sep.-Oct. 1988.
Michel, J., et al., 228Ra and 226Ra in Drinking Water: A New Technique Using Gamma-Ray Spectroscopy and Results from South Carolina, Isotope Studies of Hydrologic.
Processes, Department of Geology, University of South Carolina, pp. 83-92, date unknown.
Elsinger, R., et al., Radium-224 in Natural Waters Measured by γ-Ray Spectrometry, Analytica Chimica Acta 144, 277-281, 1982.
Valentine, R., et al., Removing Radium by Adding Preformed Hydrous Manganese Oxides, Journal AWWA, 66-71, Feb. 1990.
Healy, T., et al., The Effect of Crystal Structure on the Surface Properties of a Series of Manganese Dioxides, Journal of Colloid and Interface Science 21, 435-444, 1966.
Nathwani, J., et al., Absorption of 226Ra by Soils (I), Chemosphere 5, 285-291, 1979.
Patel, R., et al., Radium Removal from Water by Manganese Dioxide Absorption and Diatomaceous Earth Filtration, Coop. Res. Agreement No. CR-813148, USEPA, Oct. 18, 1991.
Garg, D., et al. Removal of Radium from Water by Absorption onto Barium Sulfate Impregnated and Plain Activated Alumina, Coop. Res. Agrmt. No. CR-813148, USEPA, Feb. 24, 1992.
www.eichrom.com/products/info/mno2_resin.cfm, MnO2 Resin: Another tool for radium separation & measurement, 2 pages, 2007.
Maxwell, III S., Ra in Water using MnO2 Resin: Update, Westinghouse Savannah River Company, 19 pages, date unknown.
Diphonix® Ion Exchange Resin, Eichrom Industries, 2 pages, date unknown.
Maxwell, III, S., Rapid Method for Ra-226 and Ra-228 in Water Samples, Westinghouse Savannah River Company, Contract No. DE-AC09-96SR18500 with USDoE, 20 pgs., date unknown.
Project Profile, Channahon, IL Water Treatment Plant, Pre-formed HMO Technology for Radium Removal, Tonka Equipment Company, 2 pages, date unknown.
Radium in Drinking Water, Wisconsin Department of Natural Resources, Bureau of Drinking Water & Groundwater, 2 pages, date unknown.
McKuen, P., How to Remove Radium, $50 Million Project Aims at Joliet's Water, 2 pages, date unknown.
Effective Radium Removal with HMO, Tonka Technical Bulletin, Tonka Equipment Company, 4 pages, date unknown.
Moon, D., et al., Preconcentration of radium isotopes from natural waters using MnO2 Resin, Applied Radiation and Isotopes 59, 255-262, 2003.
Removing Multiple Contaminants from Drinking Water: Issues to Consider, USEPA, 3 pages, Dec. 2007.
Sorg, T., Technologies for Radon & Radionuclide Removal, Advanced Drinking Water Conference, Atlanta, GA, , 28 pages, May 7-10, 2000.
Clifford, D., Fundamentals of Radium and Uranium Removal from Drinking Water Supplies, USEPA Radionuclides in Drinking Water Webcast, 24 pages, Aug. 4, 2004.
SenGupta, A., Radium Removal, in Ion Exchange Technology-Advances in Pollution Control, Technomic Publications, p. 25-41, 1995.
Holub, R., et al., New Technology for Radium Removal at the Village of Oswego, Illinois Section American Water Works Association Annual Conference, 39 pages, 2005.
http://www.nsf.org/Certified/PwsComponents, Water Remediation Technology (WRT), LLC, National Sanitary Foundation Listing, 1 page, date unknown.
Seigel, M., et al., Pilot Testing of Technologies to Treat Multiple Contaminants in Drinking Water at the Pine Hill School on the Ramah Navajo Reservation, 14th Annual Tribal EPA Conference, 61 pages, Nov. 2, 2006.
Doorley, Peter F., Declaration under 37 CFR 1.132, Aug. 6, 2009.

* cited by examiner

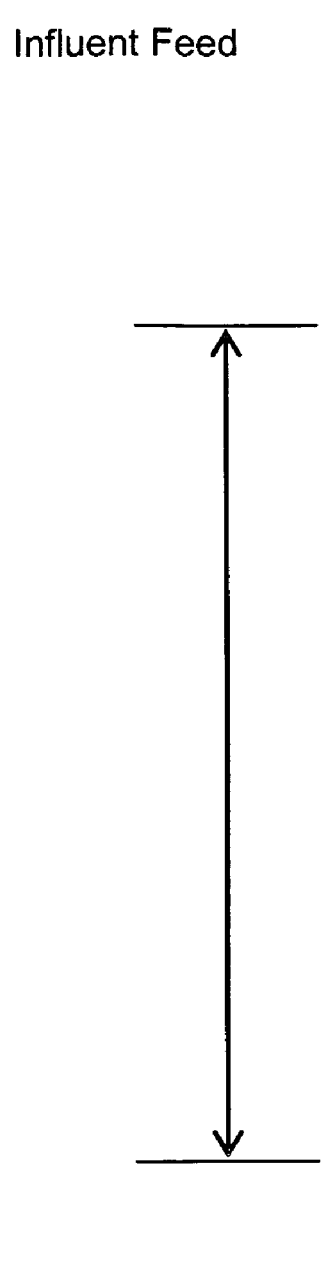
FIG. 2 Lab Column

RADIUM SELECTIVE MEDIA AND METHOD FOR MANUFACTURING

CROSS-REFERENCE TO RELATED APPLICATIONS

This application claims the benefit of U.S. Provisional Patent Application No. 61/008,974 filed Dec. 21, 2007, the disclosure of which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates to selective media for the removal of radium from aqueous sources, and in particular, to a cation resin which contains dispersed manganese oxide (DMO) and a method of manufacturing the same.

2. Brief Description of the Related Art

Radium is a divalent cation that occurs naturally in certain groundwaters, particularly in the U.S. Midwest. Radium is thought to be a carcinogen in drinking water, and, for this reason, radium levels in drinking water are regulated. For example, the U.S. Environmental Protection Agency sets a maximum contaminant level (MCL) for the total of radium 226 (Ra226) and radium 228 (Ra228) of 5.0 picocuries per liter (pCi/L).

Radium occurs at very dilute concentrations in drinking water which presents a challenge to remove radium to the extremely low regulated levels. Various processes are known, however, that are able to achieve acceptable removal efficiencies. Certain processes use the known affinity of radium for preformed hydrous manganese oxide (HMO). These conventional method use a pre-formed slurry of HMO as a coagulant which is removed with a sand filter after contacting the source water. The sludge removed in the sand filter is typically backwashed to the sewer system. Other accepted technologies for radium removal include reverse osmosis, water softener (with the brine regenerant sent to the sewer), barium doped cation resin, and the HMO-coagulation/filtration (C/F) process.

The U.S. Environmental Protection Agency reports that the Best Available Technology (BAT) for radium removal in drinking water is (a) cation exchange softening, (b) lime softening, (c) membrane processes (reverse osmosis) and (d) barium dispersed strong acid cation [1, 2]. Cation exchange softening can achieve 65-95% removal efficiency, but produces a liquid waste. Lime softening requires coagulation/filtration technology which is not considered BAT for small water supply systems, i.e., fewer than 500 connections. Lime softening can achieve 80-95% removal efficiency, but chemical precipitation produces waste solids. Membrane processes can achieve 90-99% removal efficiency, but reject water must be disposed of. Barium dispersed strong acid cation technology, such as Dowex RSC ($BaSO_4$) [3], can achieve greater than 97% removal efficiency, but suffers from barium leakage.

Dr. Dennis Clifford of the University of Houston (a recognized expert in ground water contaminant removal) reports [3] that the BAT for radium removal is (a) cation exchange softening, (b) lime softening, (c) reverse osmosis, (d) preformed hydrous manganese oxide (HMO) and sand filter, (e) precipitation with $BaSO_4$ and (f) HMO impregnated onto fibers or diatomaceous earth.

Other sorption technologies that have been tested but are not on the BAT list are:

(a) "Ion Exchange Technology—Advances In Pollution Control", by Arup K. Sengupta,—1995 [4],
(b) weak acid cation (WAC) in the hydrogen form,
(c) activated alumina,
(d) $MnO_2$ coated sand and
(e) naturally occurring zeolite minerals (Water Remediation Technologies [5, 7].

Calgon Carbon has developed an $MnO_2$ impregnated media for iron and manganese removal that requires backwashing to the sewer. CalMedia™ GSR Plus [6] is a granular manganese dioxide filtering media used for reducing soluble iron and manganese. Its active surface coating oxidizes and precipitates soluble iron and manganese. A Sandia Laboratories report [6] at pp. 31-36 describes CalMedia™ GSR as a filtration media that uses the conventional HMO C/F technology.

It is known to prepare an ion exchange resin by precipitating metal oxides within the resin. For example, SenGupta et al. disclose in U.S. Pat. No. 7,291,578 a polymeric anion exchange resin in which hydrated Fe (III) oxides are dispersed within the resin beads. In one embodiment, the process involves loading the anion exchange resin with an oxidizing anion such as $MnO_4^-$ or $OCl^-$ followed by passage of a ferrous sulfate solution through the resin.

The limitations of the prior art are overcome by the present invention as described below.

BRIEF SUMMARY OF THE INVENTION

The media of the present invention is a cation exchange resin (gel or macroporous) in which dispersed mixed manganese oxides (DMO) have been dispersed by an oxidation/reduction/precipitation chemical process. Any porous resin may be used in the practice of the invention, although a macroporous resin is preferred since its large pores and increased surface area is desirable to improve the kinetics of the removal of very low concentrations of radium ions.

It is well known that hydrous manganese oxide (HMO) significantly lowers radium levels in drinking water. HMO is used as chemical coagulant in large municipal drinking water systems which requires expensive chemical addition equipment, filters, and clarifiers. This requires significant capital and operating expense to install and operate on a continuous basis.

The radium removal media of the present invention is made by precipitating DMO inside a strong acid cation (SAC) resin by the chemical reaction of the permanganate anion (for example $NaMNO_4$) and a soluble manganese (II) salt (for example, $MnSO_4$) to form the highly dispersed mixed manganese oxides.

The method of manufacturing the radium removal media also includes the treatment of the resin containing the DMO with a reducing agent to prevent soluble manganese from leaching out of the resin bead. This is an important manufacturing step because of the EPA maximum Mn concentration limit (MCL) 0.050 mg/L.

These and other features, objects and advantages of the present invention will become better understood from a consideration of the following detailed description of the preferred embodiments and appended claim in conjunction with the drawings as described following:

BRIEF DESCRIPTION OF THE SEVERAL VIEWS OF THE DRAWINGS

FIG. 2 is a elevation view of a column showing the location of the sampling zones used in the pilot tests summarized in Tables 2, 3A and 3B.

DETAILED DESCRIPTION OF THE INVENTION

Figure 1:
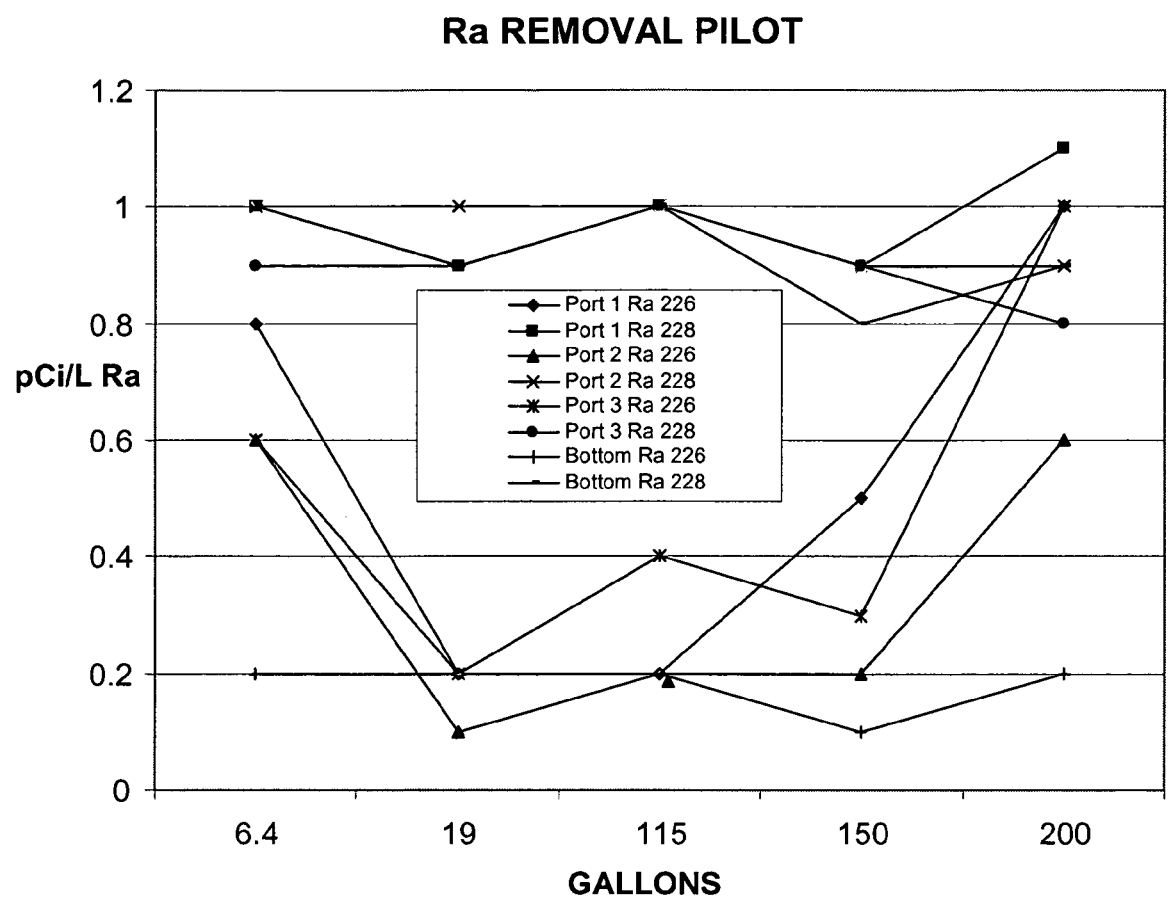
FIG. 1 is a plot summarizing the removal of radium in the pilot tests as given in Tables 2, 3A and 3B below.

The media of the present invention is made from a cation ion exchange resin. Since radium exists as cationic species ($Ra^{+2}$), the preferred polymeric media for removing the radium is a cationic polymeric resin. A cation exchange resin is preferable to avoid charge repulsion effects that might limit the adsorption ability of the resin. Examples of strongly acidic cationic resins with sulfonic functional groups that can be used in the practice of the present invention include the gel type; Rohm & Haas Amberlite IR-120, Dow Chemical's Dowex HGR, Sybron's Ionac CG8, and Purolite C-100. Cationic resins with sulfonic groups that can also be used and have a high level of surface area and large pores are sometimes referred to as macroporous cation resins. Examples that can be used are Rohm & Haas Amberlite IR-200, Dow Chemical's Dowex MSC-1, Sybron's Ionac CFP-110, and Purolite's C-150. Cationic resins can also be used that have special functional groups including carboxylic, iminodiacetic, and aminophosphonic. The previously mentioned manufacturers also provide the previously mentioned special cationic resins.

In the practice of the present invention, a gel or macroporous resin is preferred, and a macroporous resin is most preferred since its large surface area is desirable to improve the kinetics of the removal of very low concentrations of radium ions. The most preferred ion exchange media is therefore a macroporous strongly acidic cation resin. The particle size distribution is typically 600 to 850 microns.

The radium removal media is manufactured by allowing a soluble manganese (II) salt (for example, $MnSO_4$) to permeate into the resin. A solution of sodium permanganate undergoes an oxidation/reduction reaction with the soluble manganese (II) salt to precipitate non-soluble mixed manganese oxides within the resin. "Mixed manganese oxides" means a mixture of manganese oxides including $Mn^{+4}$ oxides and $Mn^{+3}$ oxides. The precipitated manganese oxides may include soluble as well as insoluble forms. The steps of manufacturing the media are described in more detail following.

The synthesis of the radium selective resin begins with converting the cationic resin into the manganese ion ($Mn^{+2}$) form. The cationic resin is also partially in the sodium ($Na^{+1}$) form to prevent excessive loading of the DMO.

The oxidation/reduction chemical process that precipitates manganese oxides is well known in the water treatment industry. The oxidation/reduction reaction chemistry that results in the formation of precipitated manganese oxides is:

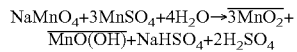

$NaMnO_4 + 3MnSO_4 + 4H_2O \rightarrow \overline{3MnO_2} + \overline{MnO(OH)} + NaHSO_4 + 2H_2SO_4$ (Note: The over score line denotes a solid phase.)

The first step in the manufacture of the DMO solid phase is to exchange the soluble $Mn^{+2}$ ion with the sodium ion on the cationic resin. It is preferred not to have the cation resin completely in the $Mn^{+2}$ form to prevent excessive pluggage of the macropores and to optimize the use of chemicals. Radium occurs in drinking water in the parts per trillion and therefore the radium is removed primarily on the surface of the DMO particles. Excess DMO will not be utilized for radium removal because of the extremely low concentration of radium. The conversion is accomplished by mixing the resin beads with a solution of sodium chloride (NaCl) and manganese sulfate ($MnSO_4$). The solution is drained from the resin beads after a sufficient period of time for the ion exchange reaction to take place. The cation resin is now in both the sodium and manganese (II) form. The preferred method of contacting the resin and solution is a continuously stirred tank.

The second step is the oxidation/reduction reaction that brings the permanganate ($MnO_4^{-1}$) anion into contact with the manganese ($Mn^{+2}$) cation. The preferred chemicals are sodium permanganate and manganous sulfate. Other compounds can be used as a source of the permanganate and manganese species including potassium permanganate and manganese chloride. The resin drained in step one is brought into contact with an oxidizing solution of sodium chloride and sodium permanganate ($NaMnO_4$). The preferred method is to use a stirred tank. However, an alternative method is to pass the oxidizing solution through a packed column of the resin beads at a sufficient period of time for the oxidation/reduction reaction to take place. When the reaction is completed the solution is drained from the column. The resin now contains the DMO solids and residual oxidation/reduction solution. The DMO solids may include a plurality of manganese oxide species, including both soluble and insoluble forms. The resin is thoroughly rinsed with several volumes of deionized water and drained. This procedure is repeated until the sodium permanganate solution has been thoroughly rinsed from the resin beads. Even after the rinsing step some soluble species may remain in the resin.

The third step is to post treat the resin containing the DMO to prevent soluble manganese from leaching out of the resin bead. The EPA maximum concentration limit in drinking water for manganese is 0.050 mg/L. Since there is manganese present in many groundwater supplies any significant leaching of manganese will cause water treated for radium removal to exceed the MCL. Therefore, it is desirable to ensure any soluble manganese species be converted into an insoluble oxide form. The conversion process consists of bringing the rinsed resin from step two into contact with an aqueous solution of a reducing agent, such as sodium metabisulfite ($Na_2S_2O_2$). There are other reducing agents that are suitable, such as sodium bisulfite, sulfurous acid and sulfur dioxide. Sodium metabisulfite is a reducing agent and will cause any residual permanganate ion to be reduced to an insoluble species. The bisulfite anion is oxidized to a sulfate/bisulfate species. The sodium metabisulfite is drained and then the resin is rinsed with deionized water and drained. This is done several times to ensure the residual reducing solution is completely removed from the resin beads. Contacting the resin with the reducing agent is preferably done in a stirred tank.

Example of Laboratory Synthesis of the Radium Selective Resin

In step one of the laboratory synthesis 100 mL of a strong acid cation macroporous resin (Purolite C-150) was slurried in a 1 liter beaker with a solution consisting of 300 mL of deionized water, 3.16 grams of manganese sulfate ($MnSO_4$) and 9.83 grams of sodium chloride. The mixture was stirred continually for one (1) hour. The solution was then drained from the resin beads.

The second step consisted of preparing the oxidizing solution containing 1,000 mL of deionized water, 60 grams of sodium chloride and 50 grams of sodium permanganate. The resin from step one was placed into a glass column and the prepared oxidizing solution was passed through the column of resin at the rate of 17 mL/min. This is approximately equal to 10 Bed Volumes per hour. The oxidizing solution was thoroughly drained from the column and then rinsed with 300 mL of deionized water (3 bed volumes).

The final step consisted of rinsing the resin in the column with a solution of sodium metabisulfite. The solution was prepared by adding 25 grams of sodium metabisulfite to 500 ml of deionized water. The solution was passed through the resin column at a rate of 17 mL/min. The resin was then thoroughly rinsed until the column effluent water reached conductivity of 40 microsiemens ($\mu$S). The resulting media is gray-black in color.

Example of Radium Selective Removal Efficiency

The prepared resin was tested on an actual sample of groundwater known to have radium above the EPA MCL of 5 pCi/L. The results are Table 1.

TABLE 1

Radium selective test results.

|  | Radium 226/228 (pCi/L) |
|---|---|
| Groundwater Influent | 7.3 |
| Effluent after 100 Bed Volumes | <1.0 |

Tables 2, 3A and 3B and FIGS. 1 and 2 show examples of the results of passing an actual sample of ground water containing Ra226 and Ra228 through the media of the present invention. The media removed the radium to below the maximum contaminant level (MCL) of 5 pCi/L. The feed water was fed through a short multi-port kinetic column. FIG. 2 is an elevation view of the column showing the location of the sampling zones. The initial raw water feed was 6 L/hr. The initial Ra226 was 3.2 pCi/L and the initial Ra 228 was 4.1 pCi/L for a total of 7.3 pCi/L.

TABLE 2

Ra226 + Ra228 Data (pCi/L)

| Vol. (Liters) | Feed | Zone 1 | Zone 2 | Zone 3 | Effl. | Flow (LPH) |
|---|---|---|---|---|---|---|
| 24.2 | 7.3 | <1.8 | <1.6 | 1.5 | <1.2 | 6.0 |
| 71.9 | 7.3 | <1.1 | <1.1 | <1.1 | 1.1 | 6.0 |
| 435 | 7.3 | <1.2 | <1.1 | <1.4 | <1.2 | 6.0 |
| 568 | 7.3 | <1.4 | <1.1 | <1.2 | <0.9 | 6.0 |
| 757 | 7.3 | 2.1 | <1.5 | <1.8 | <1.1 | 6.0 |

Tables 3A and 3B show the separate results for Ra226 and Ra228. FIG. 1 is a plot summarizing the removal of radium in the pilot tests as given in Tables 2, 3A and 3B. The column conditions were 200 mL of the radium removal media of the present invention and flow rate of 103 mL/min.

TABLE 3A

Ra226 Data

| Feed | Vol. (Liters) | Zone 1 | Zone 2 | Zone 2 | Effluent |
|---|---|---|---|---|---|
| 3.2 | 0 |  |  |  |  |
| 3.2 | 24.2 | 0.8 | 0.6 | 0.6 | <0.2 |
| 3.2 | 71.9 | 0.2 | 0.1 | <0.2 | 0.2 |
| 3.2 | 435 | 0.2 | 0.2 | 0.4 | 0.2 |
| 3.2 | 568 | 0.5 | <0.2 | 0.3 | 0.1 |
| 3.2 | 757 | 1 | 0.6 | 1 | <0.2 |

TABLE 3B

Ra228 Data

| Feed | Vol. (Liters) | Zone 1 | Zone 2 | Zone 3 | Effluent |
|---|---|---|---|---|---|
| 4.1 | 24.2 | <1.0 | <1.0 | <0.9 | <1.0 |
| 4.1 | 71.9 | <0.9 | <1.0 | <0.9 | 0.9 |
| 4.1 | 435 | <1.0 | <1.0 | <1.0 | <1.0 |
| 4.1 | 568 | <0.9 | 0.9 | <0.9 | <0.8 |
| 4.1 | 757 | 1.1 | <0.9 | <0.8 | <0.9 |

The present invention has been described with reference to certain preferred and alternative embodiments that are intended to be exemplary only and not limiting to the full scope of the present invention.

REFERENCES

[1] Removing Multiple Contaminants from Drinking Water: Issues to Consider, U.S. Environmental Protection Agency.

[2] Sorg, T., U.S. Environmental Protection Agency, "Technologies for Radon and Radionuclide Removal," Advanced Drinking Water Conference, Atlanta Ga., Association of State Drinking Water Administrators, May 7-10, 2000.

Clifford, D., University of Houston, "Fundamentals of Radium and Uranium Removal from Drinking Water Supplies," USEPA Radionuclides in Drinking Water Webcast, Aug. 4, 2004.

[4] Sengupta, A., "Ion Exchange Technology—Advances In Pollution Control", Technomic Publications, pp. 25-41, 1995

[5] Holub, R., et al., New Technology for Radium Removal at the Village of Oswego, From Evaluation through Full Scale Installation and Operation, ISAWWA 2005 Annual Conference, Illinois Section American Water Works Association.

[6] Seigel, M. et al., Sandia National Laboratories, "Pilot Testing of Technologies to Treat Multiple Contaminants in Drinking Water at the Pine Hill School on the Ramah Navajo Reservation, 14$^{th}$ Annual Tribal EPA Conference, Nov. 2, 2006.

[7] http://www.nsf.org/Certified/PwsComponents, Water Remediation Technology (WRT), LLC, National Sanitary Foundation.

What is claimed is:

1. A method of manufacturing a radium selective media, comprising the steps of:
   (a) allowing a soluble manganese (II) salt to permeate into a cation ion exchange resin to convert the cation resin into the manganese ion ($Mn^{+2}$) form;
   (b) reacting the soluble manganese (II) salt with a permanganate salt in an oxidation/reduction reaction to precipitate within the resin dispersed manganese oxides (DMO) comprising a plurality of manganese oxide species, wherein said plurality of manganese oxide species comprise $Mn^{+4}$ and $Mn^{+3}$ species and further wherein said plurality of manganese oxide species comprise both soluble and insoluble manganese species.

2. The method of claim 1, further comprising the step following step (b) of treating the resin containing the DMO with a reducing agent to convert soluble manganese species into an insoluble oxide form.

3. The method of claim 1, wherein the cation ion exchange resin is a strong acid cation resin.

4. The method of claim 1, wherein the cation ion exchange is a porous resin.

5. The method of claim 1, wherein the cation ion exchange resin is a gel resin.

6. The method of claim 1, wherein the cation ion exchange resin is a macroporous resin.

7. The method of claim 1, wherein the manganese (II) salt is manganese sulfate (MnSO4).

8. The method of claim 2, wherein the reducing agent is selected from the group consisting of sodium metabisulfite ($Na_2S_2O_2$), sodium bisulfite, sulfurous acid and sulfur dioxide.

9. The method of claim 1, wherein in step (a), the cation ion exchange resin is placed partially in the sodium ($Na^{+1}$) form to prevent excessive loading of the DMO precipitant in step (b).

10. The method of claim 9, wherein step (a) comprises mixing the cation ion exchange resin with a solution of sodium chloride (NaCl) and manganese sulfate ($MnSO_4$) to put the resin in both the sodium ($Na^{+1}$) and manganese ion ($Mn^{+2}$) forms.

11. The method of claim 10, wherein the mixing is in a continuously stirred tank.

12. The method of claim 9, wherein after step (a), the cation ion exchange resin is drained of the solution of sodium chloride (NaCl) and manganese sulfate ($MnSO_4$).

13. The method of claim 1, wherein the permanganate salt is sodium permanganate.

14. The method of claim 1, wherein the permanganate salt is potassium permanganate.

15. The method of claim 1, wherein the soluble manganese salt is manganese (II) sulfate.

16. The method of claim 1, wherein the soluble manganese (II) salt is manganese chloride.

17. The method of claim 1, wherein step (b) comprises bringing the cation ion exchange resin into contact with an oxidizing solution of sodium chloride and sodium permanganate.

18. The method of claim 17, wherein step (b) further comprising passing the oxidizing solution through a packed column of the resin for a sufficient period of time to precipitate dispersed manganese oxides (DMO) within the resin.

19. The method of claim 1, wherein after step (b) the cation ion exchange resin is rinsed with deionized water and drained.

20. The method of claim 2, further comprising the steps of draining the reducing agent from the cation ion exchange resin, rinsing the cation ion exchange resin with deionized water and draining the cation ion exchange resin.

21. The method of claim 2, wherein the cation ion exchange resin is a strong acid cation resin.

22. The method of claim 2, wherein the cation ion exchange is a porous resin.

23. The method of claim 2, wherein the cation ion exchange resin is a gel resin.

24. The method of claim 2, wherein the cation ion exchange resin is a macroporous resin.

25. The method of claim 2, wherein the manganese (II) salt is manganese sulfate (MnSO4).

26. The method of claim 2, wherein in step (a), the cation ion exchange resin is placed partially in the sodium ($Na^{+1}$) form to prevent excessive loading of the DMO precipitant in step (b).

27. The method of claim 26, wherein step (a) comprises mixing the cation ion exchange resin with a solution of sodium chloride (NaCl) and manganese sulfate ($MnSO_4$) to put the resin in both the sodium ($Na^{+1}$) and manganese ion ($Mn^{+2}$) forms.

28. The method of claim 27, wherein the mixing is in a continuously stirred tank.

29. The method of claim 26, wherein after step (a), the cation ion exchange resin is drained of the solution of sodium chloride (NaCl) and manganese sulfate ($MnSO_4$).

30. The method of claim 2, wherein the permanganate salt is sodium permanganate.

31. The method of claim 2, wherein the permanganate salt is potassium permanganate.

32. The method of claim 2, wherein the soluble manganese salt is manganese (II) sulfate.

33. The method of claim 2, wherein the soluble manganese (II) salt is manganese chloride.

34. The method of claim 2, wherein step (b) comprises bringing the cation ion exchange resin into contact with an oxidizing solution of sodium chloride and sodium permanganate.

35. The method of claim 34, wherein step (b) further comprising passing the oxidizing solution through a packed column of the resin for a sufficient period of time to precipitate dispersed manganese oxides (DMO) within the resin.

36. The method of claim 2, wherein after step (b) the cation ion exchange resin is rinsed with deionized water and drained.

37. A radium selective media made according to the process of claim 1.

38. A radium selective media made according to the process of claim 2.

39. A process for the removal of radium from drinking water comprising the step of passing drinking water containing radium through the radium selective media of claim 37.

40. A process for the removal of radium from drinking water comprising the step of passing drinking water containing radium through the radium selective media of claim 38.

* * * * *